(12) United States Patent
Joseph et al.

(10) Patent No.: US 10,733,663 B2
(45) Date of Patent: *Aug. 4, 2020

(54) SYSTEMS AND METHODS FOR STRATEGIC CUSTOMER ORDER CAPTURE

(71) Applicant: LEVEL 3 COMMUNICATIONS, LLC, Broomfield, CO (US)

(72) Inventors: George T. Joseph, Golden, CO (US); Gregory Arnold, Brighton, CO (US); Paul Farnsworth, Niwot, CO (US); Steven Rdzak, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/798,111

(22) Filed: Oct. 30, 2017

(65) Prior Publication Data

US 2018/0053248 A1    Feb. 22, 2018

Related U.S. Application Data

(63) Continuation of application No. 13/875,475, filed on May 2, 2013, now Pat. No. 9,805,412, which is a continuation of application No. 13/835,657, filed on Mar. 15, 2013, now abandoned.

(60) Provisional application No. 61/695,924, filed on Aug. 31, 2012, provisional application No. 61/644,325, filed on May 8, 2012.

(51) Int. Cl.
*G06Q 30/00* (2012.01)
*G06Q 30/06* (2012.01)
*G06F 16/00* (2019.01)
*H04L 12/24* (2006.01)

(52) U.S. Cl.
CPC ......... *G06Q 30/0643* (2013.01); *G06F 16/00* (2019.01); *H04L 41/5051* (2013.01)

(58) Field of Classification Search
None
See application file for complete search history.

(56) References Cited

U.S. PATENT DOCUMENTS

| | | | |
|---|---|---|---|
| 5,937,388 A | 8/1999 | Davis et al. | |
| 7,584,079 B2 * | 9/2009 | Lichtenberg | G06F 17/5095 703/1 |
| 7,636,728 B2 | 12/2009 | Novak | |
| 7,765,291 B1 | 7/2010 | Khan | |
| 8,788,295 B1 * | 7/2014 | Wargin | G06Q 40/08 705/4 |
| 9,292,521 B1 | 3/2016 | Goo | |

(Continued)

OTHER PUBLICATIONS

U.S. Appl. No. 13/890,164, filed May 8, 2013, Joseph, George.

(Continued)

*Primary Examiner* — Mila Airapetian

(57) ABSTRACT

Aspects of the present disclosure disclose systems and methods for providing order entry platform that automatically enables telecommunication service providers to process customer orders for telecommunication products and/or services in near real-time. More particularly, one or more interactive interfaces, dynamically driven by a products catalog, may be generated that enable telecommunication service providers to automatically process orders received from customers for such products.

20 Claims, 6 Drawing Sheets

(56) References Cited

U.S. PATENT DOCUMENTS

| | | |
|---|---|---|
| 2002/0010655 A1* | 1/2002 | Kjallstrom ............ G06Q 30/02 |
| | | 705/26.62 |
| 2002/0184111 A1 | 12/2002 | Swanson |
| 2005/0144090 A1* | 6/2005 | Gadamsetty ....... G06Q 30/0601 |
| | | 705/26.1 |
| 2006/0258397 A1* | 11/2006 | Kaplan .................. G06Q 20/12 |
| | | 455/556.1 |
| 2008/0255905 A1 | 10/2008 | Cole |
| 2009/0006169 A1 | 1/2009 | Wetzer |
| 2009/0037225 A1 | 2/2009 | Burchianti et al. |
| 2009/0048896 A1 | 2/2009 | Anandan |
| 2009/0063413 A1 | 3/2009 | Lee |
| 2010/0199260 A1 | 8/2010 | Duggal |
| 2011/0218927 A1 | 9/2011 | Addala |
| 2012/0150693 A1* | 6/2012 | Dueck ............. G06Q 10/06312 |
| | | 705/26.81 |
| 2012/0158767 A1* | 6/2012 | Drefs .................... G06Q 30/06 |
| | | 707/769 |
| 2013/0145319 A1 | 6/2013 | Wein |
| 2013/0185119 A1 | 7/2013 | Palao |
| 2014/0025426 A1 | 1/2014 | Doehring et al. |
| 2014/0095344 A1 | 4/2014 | Christenson et al. |
| 2014/0101012 A1 | 4/2014 | Kuznetsov |
| 2014/0143765 A1 | 5/2014 | Harley et al. |

OTHER PUBLICATIONS

U.S. Appl. No. 14/839,244, filed Aug. 28, 2015, Joseph, George.
"IBM Business Process Manager V7.5 Production Topologies", (Ahukanna) Oct. 2011, 422 pgs.

* cited by examiner

SYSTEMS AND METHODS FOR STRATEGIC CUSTOMER ORDER CAPTURE

CROSS-REFERENCE TO RELATED APPLICATIONS

The present application is a continuation of and claims the benefit of priority from U.S. patent application Ser. No. 13/875,475, titled "SYSTEMS AND METHODS FOR STRATEGIC CUSTOMER ORDER CAPTURE," filed May 2, 2013, the entire contents of which are fully incorporated by reference herein for all purposes. Application Ser. No. 13/875,475 is a continuation of and claims the benefit of priority from U.S. patent application Ser. No. 13/835,657, titled "SYSTEMS AND METHODS FOR STRATEGIC CUSTOMER ORDER CAPTURE," filed Mar. 15, 2013, the entire contents of which are fully incorporated by reference herein for all purposes. Application Ser. Nos. 13/875,475 and 13/835,657 both claim the benefit of priority from U.S. Provisional Application No. 61/695,924, titled "SYSTEMS AND METHODS FOR STRATEGIC CUSTOMER ORDER CAPTURE," filed Aug. 31, 2012, and U.S. Provisional Application No. 61/644,325, titled "STRATEGIC CUSTOMER ORDER CAPTURE," filed May 8, 2012, the entire contents of both being fully incorporated by reference herein for all purposes.

Aspects of the present disclosure relate to methods and systems for facilitating the ordering of telecommunication products and services. In particular, an order entry platform for providing telecommunication products and/or services is disclosed.

BACKGROUND

With the advent of wired and wireless networking, the telecommunication industry has been transformed from mainly providing telephone services to providing numerous network services and to providing the infrastructure to handle such services including access to the Internet. The unprecedented demand for high-speed network services traffic, particularly for voice, data and video services, has thus transformed the telecommunications industry. Moreover, telecommunication service providers are constantly offering upgraded or new telecommunication products and services to customers. Among the services provided are collaboration and cloud computing services, content delivery and distribution services, and voice over Internet protocol services. A customer, such as an Internet Television network provider, may, for example, obtain content delivery and distribution services from a telecommunication services provider so that they can ensure their television content is provided to users in a fast and efficient manner using the telecommunication providers network and services.

In addition to offering such products and services to customers, telecommunication service providers provide the mechanisms to process customer's orders for such products and services. Conventional methods for processing customer orders typically involve using proprietary order management systems of limited functionality or purchasing third party software capable of managing customer orders. In either case, when a telecommunication service provider wants to offer new products and services and/or modify existing products and services, the telecommunication service provider must employ developers to add functionality to the ordering system or modify existing functionality, both of which are time consuming and expensive.

It is with these concepts in mind, among others, that various aspects of the present disclosure were conceived and developed.

SUMMARY

Aspects of the present disclosure include a telecommunications product ordering system, the system including at least one processor. The at least one processor is configured to generate one or more user-interfaces for ordering at least one product from a product catalog, the product catalog including a plurality of products and at least one component defining a configurable aspect of the at least one product, the one or more user-interfaces displaying the product and the at least one component. The at least one processor is also configured to receive a modification of the product and automatically modify the one or more user-interfaces to display the modification of the product.

Aspects of the present disclosure further include methods for ordering telecommunication products. The methods includes generating, at at least one processor, one or more user-interfaces for ordering at least one product from a product catalog, the product catalog including a plurality of products and at least one component defining a configurable aspect of the at least one product, the one or more user-interfaces displaying the at least one product and the at least one component. The method further includes receiving, at the at least one processor, a modification of the product. The method includes automatically modifying, at the at least one processor, the one or more user-interfaces to display the modification of the product.

Aspects of the present disclosure include a non-transitory computer-readable medium encoded with instructions for product ordering. The instructions, executable by a processor include generating one or more user-interfaces for ordering at least one product from a product catalog, the product catalog including a plurality of products and at least one component defining a configurable aspect of the at least one product, the one or more user-interfaces displaying the at least one product and the at least one component. The instructions further include receiving a modification of the product. The instructions include automatically modifying the one or more user-interfaces to display the modification of the product.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure provide a dynamically driven order entry platform that automatically enables customers to order new telecommunication products/services or modify existing products/services, dynamically, in near real-time. More particularly, one or more interactive interfaces may be generated that enable telecommunication service providers to automatically process orders received from customers for such products and/or services (collectively referred to herein as "products"). The interactive interfaces are dynamically driven by a products catalog operating in conjunction with a rules engine to increase both the accuracy of implementation of the new and/or recently modified existing products, and the efficiency in which customer orders for such telecommunication products are processed. Using the product catalog to dynamically drive the interactive interfaces automatically enables customers to order new telecommunication products and/or existing products that have been recently modified and further enables telecommunication service providers the ability to process such orders, with minimal human intervention, effectively reducing the cost and time delays typically associated with providing such products to customers.

Figure 1:
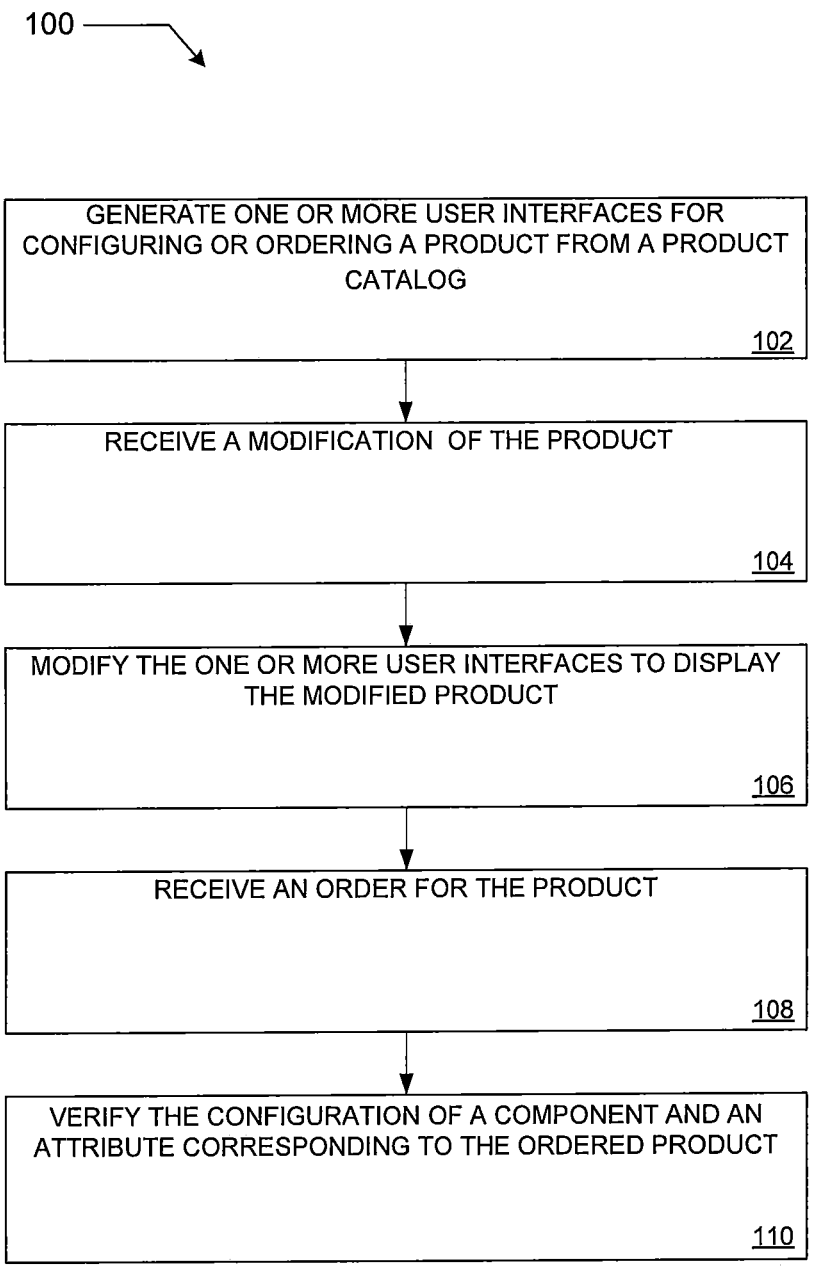
FIG. 1 is a flowchart illustrating an example process for ordering telecommunication products, according to aspects of the present disclosure.
Figure 2:
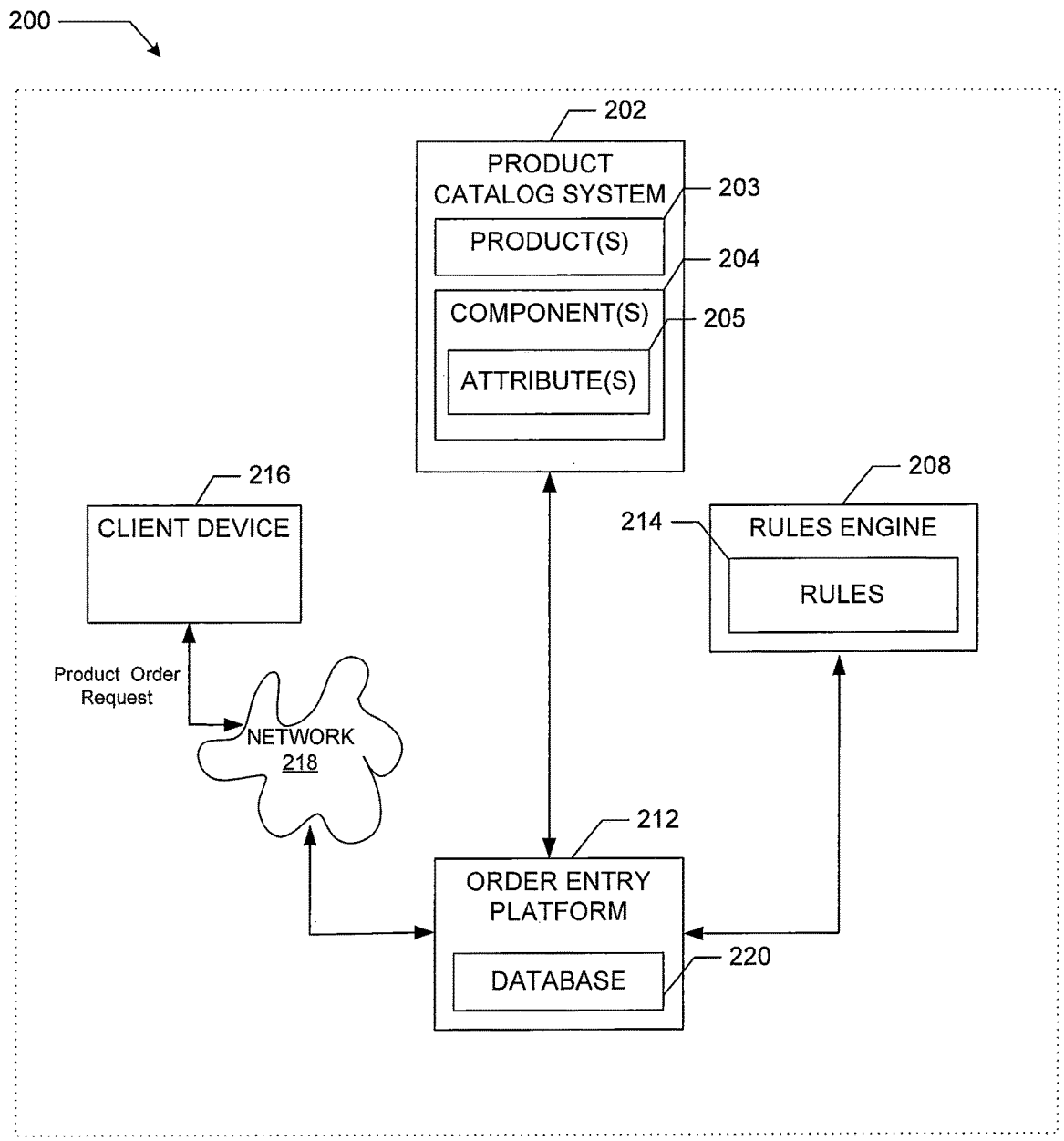
FIG. 2 is a block diagram of a computer system for processing telecommunication product orders, according to aspects of the present disclosure.

An illustrative process for providing interactive interfaces that enable the ordering of various products, such as telecommunication products from a telecommunication service provider, dynamically, in near real-time is depicted in FIGS. 1-2. In particular, FIG. 1 illustrates an example process 100 for generating one or more interactive interfaces, dynamically driven by a product catalog, all of which enable the processing of customer orders for new and/or recently modified telecommunication products. FIG. 2 illustrates a computing environment 200 including an order entry platform 202 operating in conjunction with various other hardware and/or software components that may be used to perform or otherwise execute the process 100.

As illustrated in FIG. 1, process 100 begins with generating one or more interactive interfaces/input forms (e.g. a user-interface or graphical user-interface) for configuring and/or ordering one or more products within a products catalog (operation 102). The interfaces may include various interactive elements, such as buttons, forms, fields, selections, inputs, streams, etc., for receiving input for ordering and configuring various products offered by a telecommunications service provider.

The interfaces may be generated by the order entry platform 212, which may be a personal computer, work station, server, mobile device, mobile phone, processor, and/or other type of processing device and may include one or more processors that process software or other machine-readable instructions. The order entry platform 212 may further include a memory to store the software or other machine-readable instructions and data and a communication system to communicate via a wireline and/or wireless communications, such as through the Internet, an intranet, and Ethernet network, a wireline network, a wireless network, and/or another communication network. The order entry platform 212 may include a database 220, which is a general repository of data including product data, product request data, user data, interface data, and/or any other data relating to generating interfaces for ordering and configuring products. The database 220 may include memory and one or more processors or processing systems to receive, process, query and transmit communications and store and retrieve such data. In another aspect, the database 220 may be a database server.

In one embodiment, as illustrated in FIG. 2, the product data and/or product information required to populate the interfaces generated by the order entry platform 212 may be defined in a product catalog/product catalog management system 202 ("PCS") that is configured to manage product data corresponding to one or more products 203 offered by a telecommunications service provider. The products 203 stored within the PCS 202 may generally relate to data, voice, security, video, etc. Example products 203 include: Internet services, private line services, content delivery network services, voice over internet protocol services, Internet broadcasting services, unified communications, converged data and voice services, cloud computing services, contact center services, Ethernet services, etc, to name a few. It is contemplated that any type of telecommunications product capable of being offered by a telecommunications service provider may be included in the products 203 and stored in the PCS 202. In various possible embodiments, the PCS 202 may be any commercially available product management system, such as the Tribold Agile Enterprise Product Management System, or Tribold EPMT™, Amdocs® Enterprise Product Catalog, Pimcore Content and Product Management System. Alternatively, the PCS 202 may be proprietary.

Each of the products 203 may be associated with or correspond to one or more standardized components 204. A component represents a configurable aspect of a product. Stated differently, a component represents or defines a fundamental independent characteristic or function of a product that, when combined with other components, articulates how a product will be implemented. For example, in one embodiment, a product may correspond to a "service level agreement" component that describes the level of service for a product. In another embodiment, a product may also correspond to or otherwise be associated with an "access" component that describes how a customer may access the product and/or an "intercity" component that describes how a product will connect from one geographic market to another. For example, if the products 203 included a transport product, the transport product may be associated with two access components, one for each end of the point to point transport service, and an intercity component used to account for market to market service of the transport product.

A product 203 may correspond to a "throughput" component that articulates the rate of message delivery corresponding to the product. In yet another embodiment, a product within the product 203 may correspond to a firewall component that articulates how data packets will be analyzed to determine incoming and outgoing network traffic. For example, if the products 203 included a dedicated internet access product that provides a dedicated connection from a carrier to the customer, such a product may be associated with a firewall component. Accordingly, the PCS 202 may articulate how the products 203 provided by the telecommunication service provider may be defined, bundled, consumed, modeled, etc., by associating each product 203 with one or more standardized component(s) 204.

Each component (e.g. component(s) 204), may correspond to or be associated with one or more attributes 205. Each attribute represents a characteristic and/or aspect of a particular component articulating how to implement the component. For example the access component described above may have defined attributes such as: bandwidth capacity, location information, and handoff type, among others. The bandwidth capacity attribute describes the bandwidth capabilities of the access component and the location information attributes indicates how the component may be accessed. The handoff type attribute describes how a signal will be accepted by a customer, such as in the form of an electrical signal, optical signal, via ²/₄ wire-fiber, protected/ unprotected, and the like. The SLA component may include defined attributes such as a monthly reliability attribute that describes the monthly availability requirements of the particular product or service being provided. Additionally, the SLA component may include defined attributes such as a fault restore attribute that articulates the time in which product faults must be restored.

Figure 3:
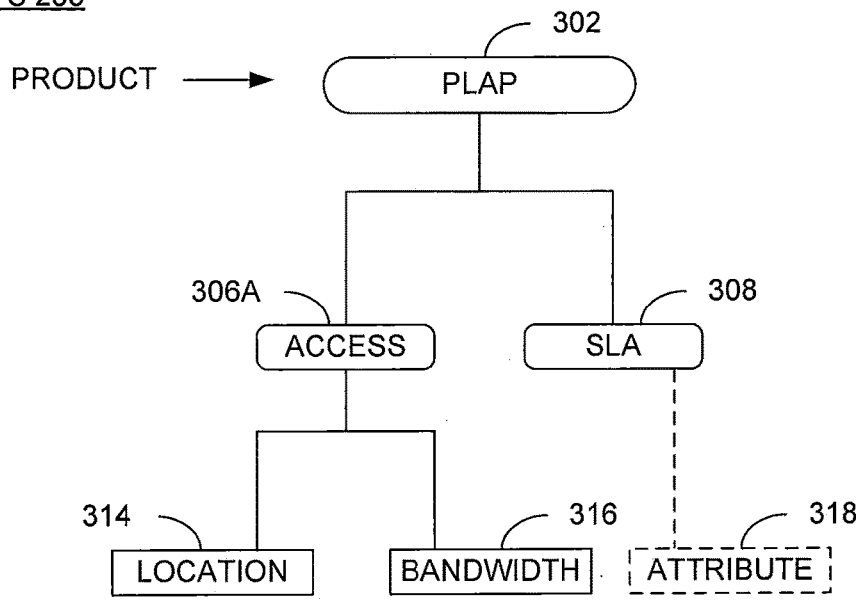
FIG. 3 is a block diagram illustrating an example product relationship, according to aspects of the present disclosure.
Figure 3:
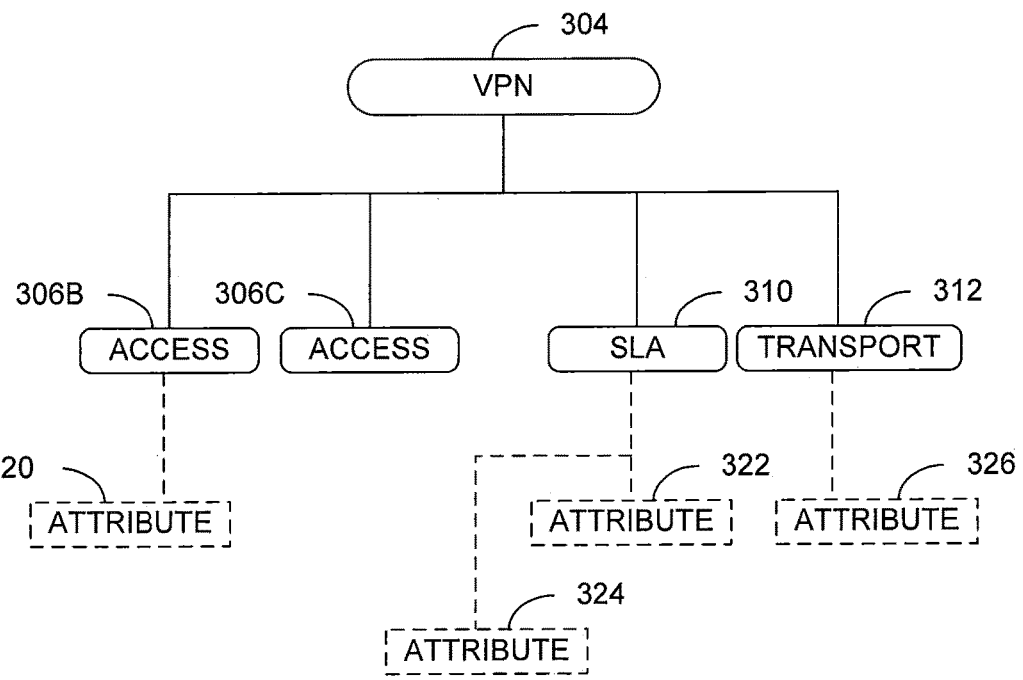

FIG. 3 provides an example illustration of the relationship between products and corresponding components and attributes within and/or managed by the PCS 202, according to one embodiment. Assume the PCS 202 includes two products (e.g. within the products 203) generally related to data access: a private line internet access product ("FLAP") 302 connecting to, for example, a private dedicated network and a virtual private network ("VPN") product 304. The FLAP 302 provides secure, dedicated internet access to a customer. The VPN 304 provides sophisticated scalability and security network capabilities. In order to provide the FLAP 302 to a customer, various components, defined within the PCS 202 corresponding to the FLAP 302, are be configured. In particular, the FLAP may require the configuration of an "access" component 306 and a "service level agreement" component 308. The access component 306 may be configured to define how a customer will access the FLAP 302. The service level agreement component may be configured to define the level of service that FLAP 302 will provide to the customer. Additionally, the VPN 304 may require the configuration of multiple components, such as two access components 310-312, a service level agreement 314, and a "transport" component 316. Importantly, both the "access" component and the "service level agreement" component may be associated with both the FLAP 302 and the VPN 304, effectively making such components reusable. Thus, any component may be associated with any number of products, and a product may include or have multiple corresponding components of the same or different type. Referring to the FLAP 302, for example in one embodiment, the FLAP 302 may include or otherwise correspond to two access components defining two different access types for the FLAP 302.

Each of the various components configured may include or otherwise be associated with one or more attributes (318-326). As described above, an attribute is a represents a characteristic and/or aspect of a particular component articulating how to implement the component. Accordingly, in one embodiment, the access components (306A-306O) may be associated with a bandwidth capacity attribute 314 describing the bandwidth capacity of the access component 306A of the FLAP 302 and a location attribute 312 describing indicating the particular location at which the access component 306A of the FLAP may be located. Any attribute may be associated with any number of components, and a component may include or have multiple corresponding attributes of the same or different type. For example, as illustrated, in one embodiment, the SLA 302 component of the VPN 304 may include or otherwise be associated with to two attributes 322-324, while the Transport 312 component of the VPN 304 may include or otherwise be associated with only one attribute 326.

The order entry platform 212 may include various functions, processes, and/or instructions that when executed, generate interfaces populated and/or driven by the products 203 defined within the PCS 202, effectively making such interfaces dynamic and data-driven. Such interfaces generated by the order entry platform 212 may be used to allow customers to submit product orders for products defined within the products 203 of the PCS 202.

For example, referring again to FIG. 1-2, a customer, interested in ordering one or more products defined within the products 203 of the PCS 202, may access a client device 216 to initiate a product order request for ordering one or more products, which may be received by the order entry platform 212 (operation 108). In response, the order entry platform 212 may transmit instructions that may be processed and/or executed to generate, or otherwise display, one or more interactive interfaces or input forms (e.g. a user-interface) for configuring one or more components and/or attributes corresponding to the ordered product. The various user-interfaces may include interactive elements, such as buttons, forms, fields, selections, inputs, streams, etc., for receiving input to configure the components, attributes, etc., corresponding to the product.

The client device 216 may be a personal computer, work station, server, mobile device, mobile phone, tablet device, processor, and/or other processing device capable of implementing and/or executing server processes, software, applications, etc. Additionally, the client device 216 may include one or more processors that process software or other machine-readable instructions and may include a memory to store the software or other machine-readable instructions and data. The client device 216 may also include a communication system to communicate with the various components of the order entry platform 212 via a wireline and/or wireless communications, such as through a network 218, such as the Internet, an intranet, an Ethernet network, a wireline network, a wireless network, a mobile communications network, and/or another communication network. The various interactive interfaces generated in response to the product order request may be displayed at the client device 216.

Figure 4A:
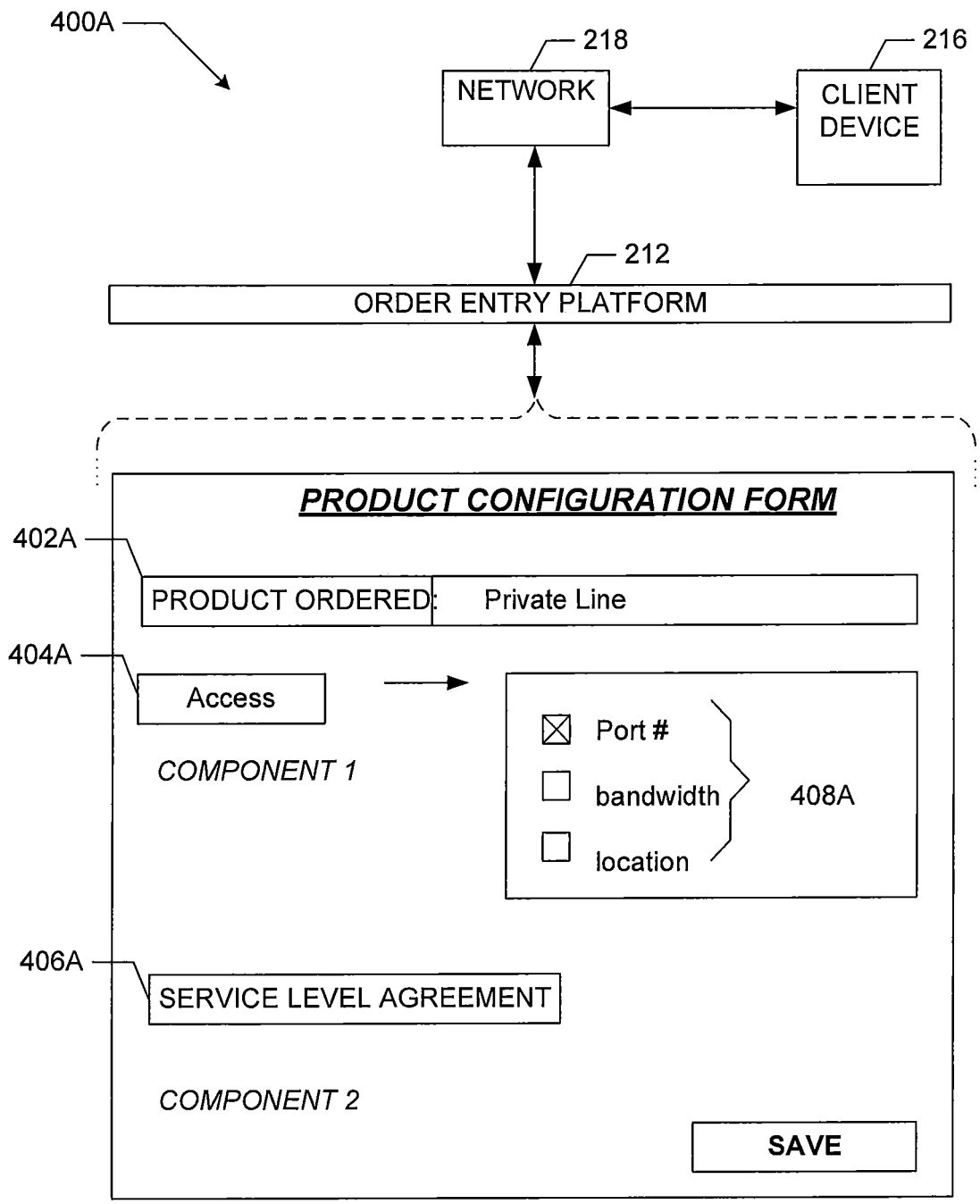
FIGS. 4A-4B are example input forms, according to aspects of the present disclosure.
Figure 4B:
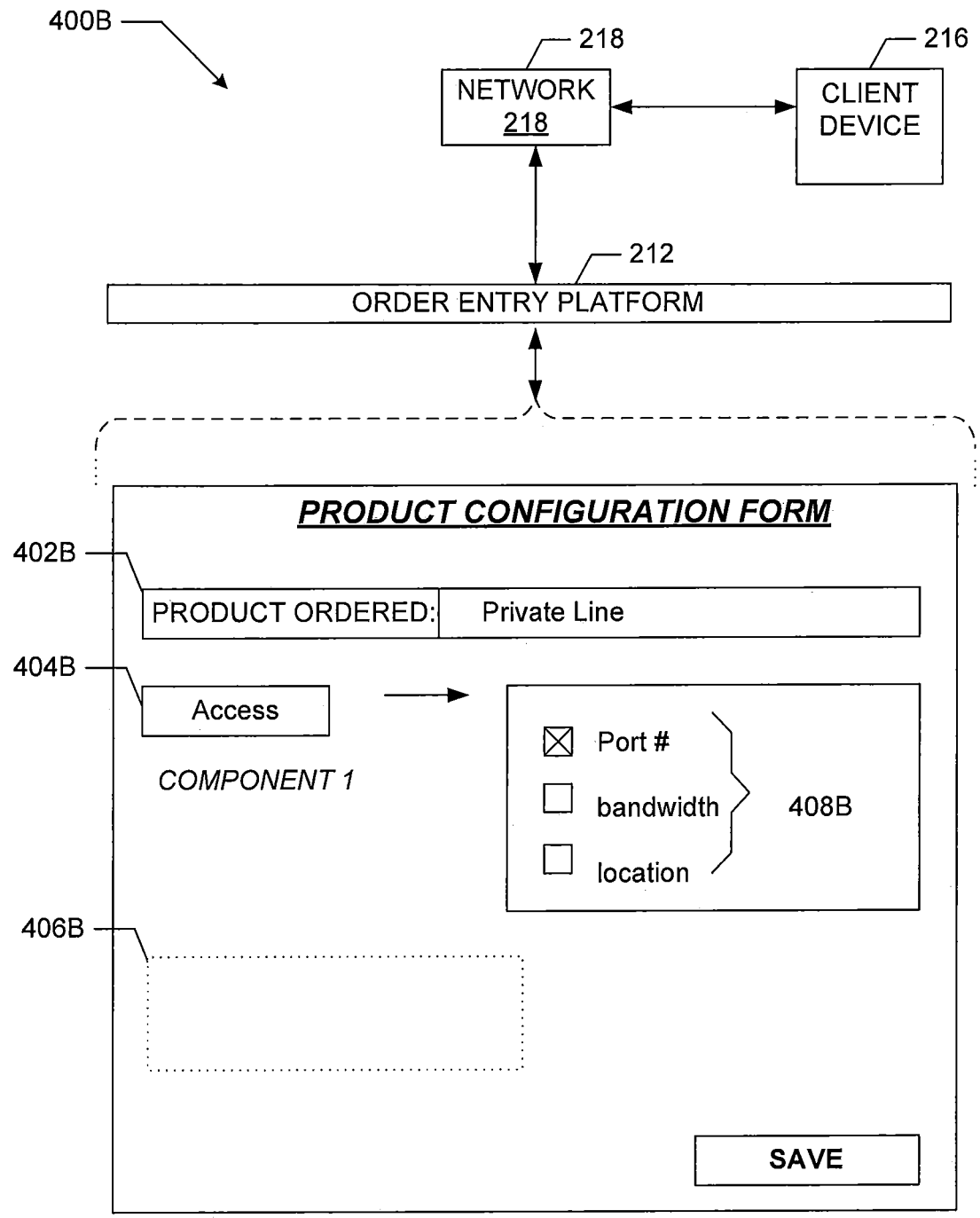

FIG. 4A illustrates and example interface 400A generated by the order entry platform 212 for configuring and ordering products, such as for example, a FLAP 402A. Since the FLAP product had been defined within the products 203 of the PCS 202 as having two corresponding components, an access component 306A and a SLA component 308, the generated interface includes two components (an access component 404A and SLA component 406A). Thus, as illustrated, input corresponding to the two components 404A and 406A may be received to configure the FLAP 402A.

Once a component has been configured (e.g. the access component 404A or the SLA component 406A), one or more attributes corresponding to the configured components may also be configured. As illustrated in FIG. 4A, since the access component 404 has been associated with the FLAP 402A, one or more attributes 408A corresponding to the access component 404A may now and also be configured. For example, as illustrated, a port number may be assigned to the access point 404A that uniquely identifies how the access point may connect to a network such as the Internet. It is contemplated that any attribute corresponding to a configured component may be configured.

Any configured components/attributes of an ordered product, or other product, may be submitted for verification (operation 110). More specifically, the order entry platform 212 may interact with, and/or be in operable communication with the rules engine 208. The rule engine 208 is configured to validate the configurations of products and corresponding components and attributes of an ordered product. In particular, the rules engine 208 is configured to define and execute one or more rules 214 for verifying various aspects of the products 203 and any corresponding components and/or attributes within the PCS 202. The rules 214 include policies, requirements, and/or conditional statements that are used to determine the validity and/or context of various product configurations made within and/or submitted to the order entry platform 212. Stated differently, the rules define the context in which a configuration of components (e.g. component(s) 204) corresponding to the products 203 and any attributes 205 within the components are valid. Thus, when a particular product and its associated component and/or attributes are selected from the PCS 202, the order entry platform 212 may query the rules engine 208 to identify rules applicable to the particular product (and optionally the particular version of the product if the product has multiple versions). Subsequently, the order entry platform 212 may use the identified rules to influence any interfaces the order entry platform 212 may generate, such as for example, limiting the display of any invalid product configurations (real time feedback to the user to facilitate easy collection of data).

Moreover, once the configuration of a product and its corresponding components and attribute has been received, the order entry platform 212 may transmit the configuration to the rules engine 208 for final verification. The configuration is accepted if the rules engine 208 indicates acceptance to the order entry platform 212. If the configuration is not accepted, information is provided from the rules engine 208 to the order entry platform 212 describing why the configuration did not pass final validation. Referring to the FLAP example, assume that the "access" component was associated with two attributes: an ingress and egress attribute field that may be used to determine the appropriate ingress and egress channels for configuring connections from the private line to a private dedicated network. A rule within the rules 214 may be defined that ensures that the ingress and egress attributes have been defined with a valid value.

Often, changes, updates, modifications, etc., may be made to a particular product defined within the products 203 of the PCS 202. Stated differently, a telecommunication service provider may make one or more changes to a particular product among the products 203 for a variety reasons. More particularly, the telecommunication service provider may be upgrading the various product and/or services it offers. Alternatively, the telecommunication service provider may be adding new products and/or services, new versions of products and/or services, or terminating existing products and/or services, and the like. For example, new versions of a product may be created within the PCS 202 with components that have new values for existing attributes and/or components. Thus, referring again to FIG. 1, a modification to a product, product component, and/or attribute corresponding to a particular product may be received (operation 104).

In one embodiment, the received modification may be a modification to a component corresponding to a particular product and/or a modification to an attribute of a component corresponding to a product within the PCS 202. In one embodiment, the modification may include the disassociation of components. For example, referring to the FLAP product described above, a modification may be received indicating that the configuration no longer requires the configuration of an SLA component. In another embodiment, the modification may include an association of components with products. Referring again to the FLAP product, the modification may include the association of a "transport component," which was not originally associated with the FLAP product when it was originally defined.

The modification may be to associate and/or disassociate one or more attributes associated with or included within a particular component corresponding to a particular product. For example, referring to the access component described above, the modification may include a request to disassociate the bandwidth attribute with the access component. Alternatively, the modification may be to associate a new attribute to the access component. It is contemplated that any type of modification articulating a specific combination of components, and/or attributes corresponding to a specific product may be received. Any received modification may also include the generation of a new rule set corresponding to the modified product, or alternatively, a modification to existing rules corresponding to the modified product, all of which may be maintained within the rules engine 208.

In response to the received modification, the various interfaces generated to enable customers to order products may be automatically modified to display the new products, components and/or attributes (operation 106). Stated differently, the generated user-interfaces may be dynamically driven by any modifications received by the product management system 202 and/or the order entry platform 212. The dynamic behavior occurs within the presentation (e.g. the user-interfaces) of the products and any corresponding components and/or attributes. Thus, when a modification to a product is received, the user-interfaces presenting or otherwise displaying the product and any corresponding components, attributes, etc., will automatically update or change based on the modification. For example, assume a telecommunication service provider currently offers a dedicated internet access product associated with an access component. The access component is associated with a "handoff" attribute that currently represents how a customer will accept delivery of the dedicated internet access service (e.g. via an electrical Ethernet connection, or a 2 wire fiber connection). At a later time, the telecommunication service provider may decide to begin offering the product via a wireless handoff. Thus, the dedicated internet access product's corresponding access component would have to be updated to include the new handoff type, and any rules corresponding to the product to accept the new configuration.

An illustrative example, of a product modification will now be provided. Assume a customer is interested in purchasing a FLAP product that is currently defined in the products 203 of the PCS 202 as illustrated in FIG. 3. Thus, the customer accesses the client device 216 and interacts with various interfaces and/or input forms generated by the order entry platform 202 for ordering products. In particular, the interlace includes an access component corresponding to the FLAP that may be configured and a service level agreement component as illustrated in FIG. 4A. Momentarily, the telecommunication service provider offering the FLAP product to customers decides that it no longer wants to negotiate with respect to the level of service being offered to customers and instead wants to start offering a flat, fixed level of service for all customers. Thus, the telecommunication service provider may access the order entry platform 212 and submit a request to disassociate the SLA component with the FLAP product. In response, the order entry platform 212 may automatically update the various interfaces being displayed to the customer interested in ordering a FLAP product to indicate that an SLA component corresponding to the FLAP is no longer configurable, as illustrated in 4B at 406B.

Figure 5:
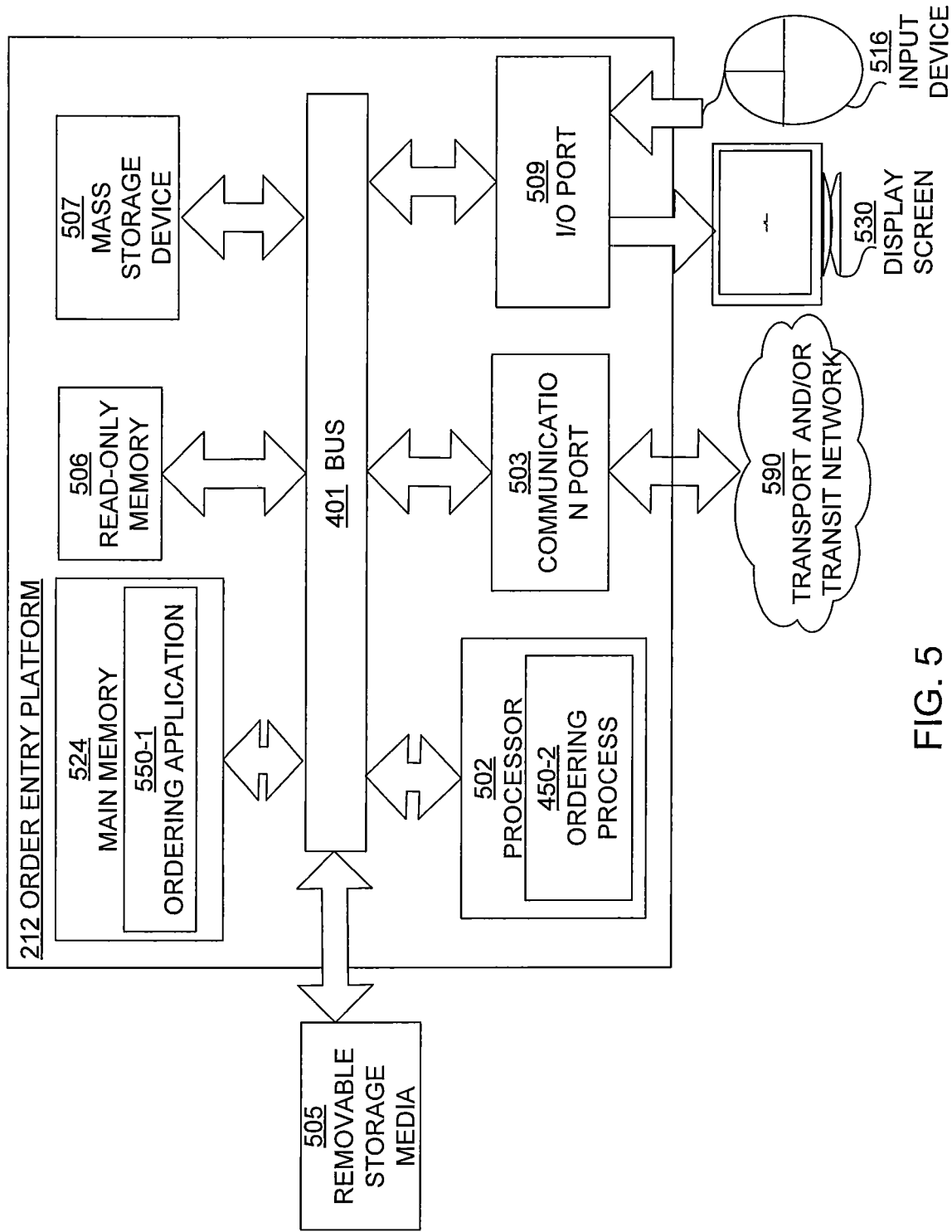
FIG. 5 is an example block diagram of an order entry platform, according to aspects of the present disclosure.

FIG. 5 is example schematic diagram of a computing system implementing an order entry platform 212 that may be use to receive and process orders for various telecommunication products, according to one embodiment. The computing system for the order entry platform 212 includes a bus 501 (i.e., interconnect), at least one processor 502, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computer system 100 connects. The order entry platform 112 may be in communication with peripheral devices (e.g., display screen 530, input device 516 via Input/Output (I/O) port 509.

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage and communications blocks. Bus 501 can be a PCI PCI-X, SCSI, or Universal Serial Bus (USB) based system bus (or other) depending on the storage devices used. Removable storage media 505 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with the ordering application 550-1 that supports functionality as discussed above and as discussed further below. For example, in one embodiment, the ordering application 550-1 may include or otherwise implement the various processes and/or instructions described herein. Ordering application 550-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the ordering application 550-1. Execution of ordering application 550-1 produces processing functionality in ordering process 550-2. In other words, the ordering process 550-2 represents one or more portions of the ordering application 550-1 performing within or upon the processor(s) 202 in the computer system 500.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A telecommunication product ordering system comprising:
 a database server comprising at least one processor and a memory system, the at least one processor operable to execute computer-readable instructions stored on the memory system to:
  generate one or more user-interfaces for ordering at least one product from a product catalog, the product catalog including a plurality of products and at least one component defining a configurable aspect of the at least one product, the one or more user-interfaces displaying the product and the at least one component;
  receive a modification of the product, wherein the modification includes associating at least one other component corresponding to the at least one product, and wherein the modification is received during presentation of the one or more user-interfaces;

automatically modify the one or more user-interfaces to display the modification of the product, wherein to display the at least one other component comprises displaying one or more interactive elements for configuring the at least one other component on the one or more user-interfaces and wherein the at least one processor is further configured to receive a configuration of the at least one other component and verify the configuration by:

executing one or more rules of a rules engine, the one or more rules corresponding to the at least one other component; and receiving a final indication that the configuration passed the one or more rules; and provide the modified product to a customer.

2. The system as recited in claim 1, wherein the modification is a first modification, and wherein the at least one processor is further configured to:

receive a second modification of the product, wherein the second modification includes a removal of the at least one component corresponding to the at least one product; and automatically modify the one or more user-interfaces based on the second modification.

3. The system as recited in claim 1, wherein the at least one component includes a configurable attribute describing how to implement the at least one component and wherein the one or more user-interfaces further comprises one or more interactive elements for configuring the configurable attribute.

4. The system as recited in claim 3, wherein the modification is a first modification, and wherein the at least one processor is further configured to:

receive a second modification of the product, wherein the second modification includes defining another configurable attribute for the at least one component; and automatically modify the one or more user-interfaces based on the second modification.

5. The system as recited in claim 1, wherein the at least one product is at least one of Internet services, content delivery network services, voice over internet protocol services, Internet broadcasting services, unified communications, converged data and voice services, cloud computing services, contact center services, and Ethernet services.

6. The system as recited in claim 1, wherein each product of the plurality of products is a telecommunication product provided by a telecommunications service provider.

7. A method for ordering telecommunication products comprising:

providing a database server comprising at least one processor and a memory system, the at least one processor operable to execute computer-readable instructions stored on the memory to perform the steps of:

generating one or more user-interfaces for ordering at least one product from a product catalog, the product catalog including a plurality of products and at least one component defining a configurable aspect of the at least one product, the one or more user-interfaces displaying the at least one product and the at least one component;

receiving a modification of the product, wherein the modification includes associating at least one other component corresponding to the at least one product, and wherein the modification is received during presentation of the one or more user-interfaces;

automatically modifying the one or more user-interfaces to display the modification of the product;

wherein to display the at least one other component comprises displaying one or more interactive elements for configuring the at least one other component on the one or more user-interfaces, the method further comprising:

receiving a configuration of the at least one other component and verifying the configuration by:

executing one or more rules of a rules engine, the one or more rules corresponding to the at least one other component; and receiving a final indication that the configuration passed the one or more rules; and providing the modified product to a customer.

8. The method as recited in claim 7, wherein the modification is a first modification, the method further comprising:

receiving a second modification of the product, wherein the second modification includes a removal of the at least one component corresponding to the at least one product; and automatically modifying the one or more user-interfaces based on the second modification.

9. The method as recited in claim 7, wherein the at least one component includes a configurable attribute describing how to implement the at least one component and wherein the one or more user-interfaces further comprises one or more interactive elements for configuring the configurable attribute.

10. The method as recited in claim 9, wherein the modification is a first modification, the method further comprising:

receiving a second modification of the product, wherein the second modification includes defining another configurable attribute for the at least one component; and automatically modifying the one or more user-interfaces based on the second modification.

11. The method as recited in claim 7, wherein the at least one product is at least one of Internet services, content delivery network services, voice over internet protocol services, Internet broadcasting services, unified communications, converged data and voice services, cloud computing services, contact center services, and Ethernet services.

12. The method as recited in claim 7, wherein each product of the plurality of products within the product catalog is a telecommunication product provided by a telecommunications service provider.

13. A non-transitory computer-readable medium encoded with instructions for product ordering, the instructions comprising:

by a database server comprising at least one processor and memory system storing the computer-readable medium, the at least one processor operable to execute the instructions for:

generating one or more user-interfaces for ordering at least one product from a product catalog, the product catalog including a plurality of products and at least one component defining a configurable aspect of the at least one product, the one or more user-interfaces displaying the at least one product and the at least one component;

receiving a modification of the product, wherein the modification includes associating at least one other component corresponding to the at least one product, and wherein the modification is received during presentation of the one or more user-interfaces;

automatically modifying the one or more user-interfaces to display the modification of the product;

wherein to display the at least one other component comprises displaying one or more interactive elements for configuring the at least one other component on the one or more user-interfaces, the instructions further comprising:

receiving a configuration of the at least one other component and verify the configuration by:

executing one or more rules of a rules engine, the one or more rules corresponding to the at least one other component; and receiving a final indication that the configuration passed the one or more rules; and providing the modified product to a customer.

14. The non-transitory computer-readable medium as recited in claim 13, wherein the modification is a first modification, and wherein the at least one processor is further operable to execute the instructions for:

receiving a second modification of the product, wherein the second modification includes a removal of the at least one component corresponding to the at least one product; and automatically modifying the one or more user-interfaces based on the second modification.

15. The non-transitory computer-readable medium as recited in claim 13, wherein the at least one component includes a configurable attribute describing how to implement the at least one component and wherein the one or more user-interfaces further comprises one or more interactive elements for configuring the configurable attribute.

16. The non-transitory computer-readable medium as recited in claim 15, wherein the modification is a first modification, and wherein the at least one processor is further operable to execute the instructions for:

receiving a second modification of the product, wherein the second modification includes defining another configurable attribute for the at least one component; and automatically modifying the one or more user-interfaces based on the second modification.

17. The non-transitory computer-readable medium as recited in claim 13, wherein the at least one product is at least one of Internet services, content delivery network services, voice over internet protocol services, Internet broadcasting services, unified communications, converged data and voice services, cloud computing services, contact center services, and Ethernet services.

18. The system as recited in claim 3, wherein the describing how to implement the at least one component comprises at least one of a level of service associated with a service level agreement, a way to access the at least one component, or a type of signal.

19. The system as recited in claim 1, wherein executing the one or more rules comprises the at least one processor being further configured to determine that a value associated with the at least one product satisfies the one or more rules.

20. The system as recited in claim 19, wherein the value is associated with a configurable attribute describing how to implement the at least one component.

* * * * *